(12) United States Patent
Hong et al.

(10) Patent No.: US 9,190,207 B2
(45) Date of Patent: Nov. 17, 2015

(54) MULTILAYER CERAMIC ELECTRONIC COMPONENT HAVING EXTERNAL ELECTRODES WHICH INCLUDE A METAL LAYER AND CONDUCTIVE RESIN LAYER

(71) Applicant: SAMSUNG ELECTRO-MECHANICS CO., LTD., Suwon, Gyunggi-do (KR)

(72) Inventors: Kyung Pyo Hong, Gyunggi-do (KR);
Byung Jun Jeon, Gyunggi-do (KR);
Byoung Jin Chun, Gyunggi-do (KR);
Jae Hwan Han, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 91 days.

(21) Appl. No.: 13/871,767

(22) Filed: Apr. 26, 2013

(65) Prior Publication Data

US 2014/0233147 A1    Aug. 21, 2014

(30) Foreign Application Priority Data

Feb. 20, 2013    (KR) .......................... 10-2013-0018273

(51) Int. Cl.
*H01G 4/008*    (2006.01)
*H01G 4/232*    (2006.01)
*H01G 4/12*    (2006.01)
*H01G 4/30*    (2006.01)

(52) U.S. Cl.
CPC .............. *H01G 4/008* (2013.01); *H01G 4/2325* (2013.01); *H01G 4/30* (2013.01); *H01G 4/12* (2013.01)

(58) Field of Classification Search
CPC ........ H01G 4/008; H01G 4/2325; H01G 4/30; H01G 4/12
USPC .................... 361/305, 306.3, 321.2
See application file for complete search history.

(56) References Cited

U.S. PATENT DOCUMENTS 5,781,402 A * 7/1998 Fujiyama et al. .......... 361/321.4
6,956,731 B2 * 10/2005 Yoshii et al. ............... 361/321.1
(Continued)

FOREIGN PATENT DOCUMENTS

JP    03296205 A * 12/1991
JP    8-180731 A    7/1996
(Continued)

OTHER PUBLICATIONS

Korean Office Action issued in Korean Application No. 10-2013-0018273 dated May 23, 2014, w/English translation.

(Continued)

*Primary Examiner* — David M Sinclair
(74) *Attorney, Agent, or Firm* — McDermott Will & Emery LLP (57) ABSTRACT

There is provided a multilayer ceramic electronic component, including a ceramic body including dielectric layers; a plurality of internal electrodes stacked within the ceramic body, and external electrodes formed on external surfaces of the ceramic body and electrically connected to the internal electrodes, wherein the external electrodes include a metal layer and a conductive resin layer formed on the metal layer, the conducive resin layer containing a copper powder and an epoxy resin, the copper powder including a first copper powder having a content of 10 wt % or more and a particle diameter of 2 μm or greater and a second copper powder having a content of 5 wt % or more and a particle diameter of 0.7 μm or smaller, the first copper powder being a mixture of spherical powder particles and flake type powder particles.

10 Claims, 3 Drawing Sheets

(56) References Cited

U.S. PATENT DOCUMENTS

| | | |
|---|---|---|
| 6,982,864 B1 * | 1/2006 | Sridharan et al. .......... 361/321.1 |
| 8,174,816 B2 * | 5/2012 | Seo et al. .................... 361/321.2 |
| 2005/0083637 A1 | 4/2005 | Yoshll et al. |
| 2006/0137488 A1 * | 6/2006 | Sakaue et al. .................... 75/255 |
| 2009/0040688 A1 * | 2/2009 | Kayatani .................... 361/321.1 |

FOREIGN PATENT DOCUMENTS

| | | | |
|---|---|---|---|
| JP | 2000138130 A * | 5/2000 | |
| JP | 2002-298649 A | 10/2002 | |
| JP | 2003331649 A * | 11/2003 | |
| JP | 2005200734 A * | 7/2005 | |
| JP | 2008-112759 A | 5/2008 | |
| WO | 03/075295 A1 | 9/2003 | |

OTHER PUBLICATIONS

Korean Notice of Office Action issued in corresponding Korean Patent Application No. 10-2013-0018273 mailed on Mar. 26, 2015; 7 pages with English translation.

* cited by examiner

FIG. 5

MULTILAYER CERAMIC ELECTRONIC COMPONENT HAVING EXTERNAL ELECTRODES WHICH INCLUDE A METAL LAYER AND CONDUCTIVE RESIN LAYER

CROSS-REFERENCE TO RELATED APPLICATIONS

This application claims the priority of Korean Patent Application No. 10-2013-0018273 filed on Feb. 20, 2013, in the Korean Intellectual Property Office, the disclosure of which is incorporated herein by reference.

BACKGROUND OF THE INVENTION

1. Field of the Invention

The present invention relates to a conductive paste for an external electrode and a multilayer ceramic electronic component including the same, capable of improving equivalent series resistance (ESR) characteristics in the multilayer ceramic electronic component.

2. Description of the Related Art

In accordance with the recent trend for the miniaturization of electronic products, multilayer ceramic electronic components have also been required to have smaller sizes and larger capacitances.

For this reason, attempts at thinning and increasing dielectric layers and internal electrodes stacked on one another have been performed using various methods. Recently, multilayer ceramic electronic components having dielectric layers having a reduced thickness and an increased number of laminations have been manufactured.

Along with this, as an external electrode is also required to be thinner, plating liquid may penetrate into a chip through the thinned external electrode, and thus there are technical difficulties in the miniaturization of electronic products.

Particularly, when the external electrode has an irregular shape, the possibility that the plating liquid may penetrate through a thin portion of the external electrode, resulting in a failure to secure reliability.

In addition, in terms of securing reliability, cracks and the like may occur due to external impacts. The occurrence of cracks may also result from the fact that the external electrode may not sufficiently absorb stress, or stress may occur by a plating layer.

In order to solve the defects, a resin composition containing a conductive material is coated between a metal layer of the external electrode and a plating layer, so that external impacts may be absorbed and reliability may be improved.

However, in the case of coating the resin composition, an increase in equivalent series resistance (ESR) may be caused as compared with the case of a general copper (Cu) sintered external electrode.

Therefore, research into multilayer ceramic electronic components having excellent equivalent series resistance (ESR) as well as high degrees of reliability implemented therein is still required.

RELATED ART DOCUMENT (Patent Document 1) Japanese Patent Laid-Open Publication No. 2008-112759

SUMMARY OF THE INVENTION

An aspect of the present invention provides a conductive paste for an external electrode and a multilayer ceramic electronic component including the same, capable of improving equivalent series resistance (ESR) characteristics in the multilayer ceramic electronic component.

According to an aspect of the present invention, there is provided a multilayer ceramic electronic component, including: a ceramic body including dielectric layers; a plurality of internal electrodes stacked within the ceramic body; and external electrodes formed on external surfaces of the ceramic body and electrically connected to the internal electrodes, wherein the external electrodes include a metal layer and a conductive resin layer formed on the metal layer, the conducive resin layer containing a copper powder and an epoxy resin, the copper powder including a first copper powder having a content of 10 wt % or more and a particle diameter of 2 μm or greater and a second copper powder having a content of 5 wt % or more and a particle diameter of 0.7 μm or smaller, the first copper powder being a mixture of spherical powder particles and flake type powder particles.

Here, in the first copper powder, a content of the spherical powder particles may be equal to or greater than a content of the flake type powder particles.

The spherical powder particles have a major axis to minor axis length ratio (major axis/minor axis) of 1.45 or smaller.

The flake type powder particles have a major axis to minor axis length ratio (major axis/minor axis) of 1.95 or greater.

Here, an equivalent series resistance (ESR) of the multilayer ceramic electronic component may satisfy 0.1 mΩ≤ESR≤30 mΩ.

According to another aspect of the present invention, there is provided a multilayer ceramic electronic component, including: a ceramic body including dielectric layers; a plurality of internal electrodes stacked within the ceramic body; and external electrodes formed on external surfaces of the ceramic body and electrically connected to the internal electrodes, wherein the external electrodes include a metal layer and a conductive resin layer formed on the metal layer, the conducive resin layer containing a copper powder and an epoxy resin, the copper powder including a first copper powder having a particle diameter of 2 μm or greater and a second copper powder having a particle diameter of 0.7 μm or smaller, the first copper powder being a mixture of spherical powder particles and flake type powder particles, an area occupied by the first copper powder in the conductive resin layer being 10% or more, and an area occupied by the second copper powder in the conductive resin layer being 5% or more.

Here, in the first copper powder, an area occupied by the spherical powder particles in the external electrodes may be equal to or greater than an area occupied by the flake type powder particles in the external electrodes.

The spherical powder particles may have a major axis to minor axis length ratio (major axis/minor axis) of 1.45 or smaller.

The flake type powder particles may have a major axis to minor axis length ratio (major axis/minor axis) of 1.95 or greater.

Here, an equivalent series resistance (ESR) of the multilayer ceramic electronic component may satisfy 0.1 mΩ≤ESR 30 mΩ.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
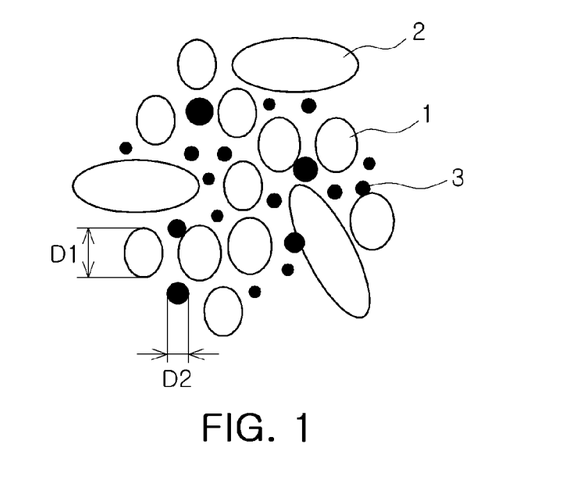
FIG. 1 is a view schematically illustrating a copper powder for an external electrode of a multilayer ceramic capacitor according to an embodiment of the present invention.

FIG. 1 is a view schematically illustrating a copper powder for an external electrode of a multilayer ceramic capacitor according to an embodiment of the present invention.

Figure 2:
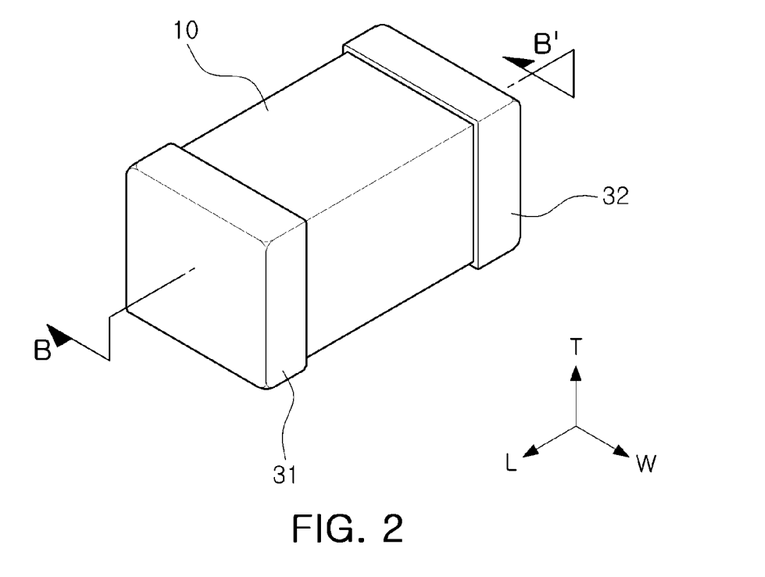
FIG. 2 is a perspective view schematically illustrating a multilayer ceramic capacitor according to an embodiment of the present invention.

FIG. 2 is a perspective view schematically illustrating a multilayer ceramic capacitor according to an embodiment of the present invention.

Figure 4:
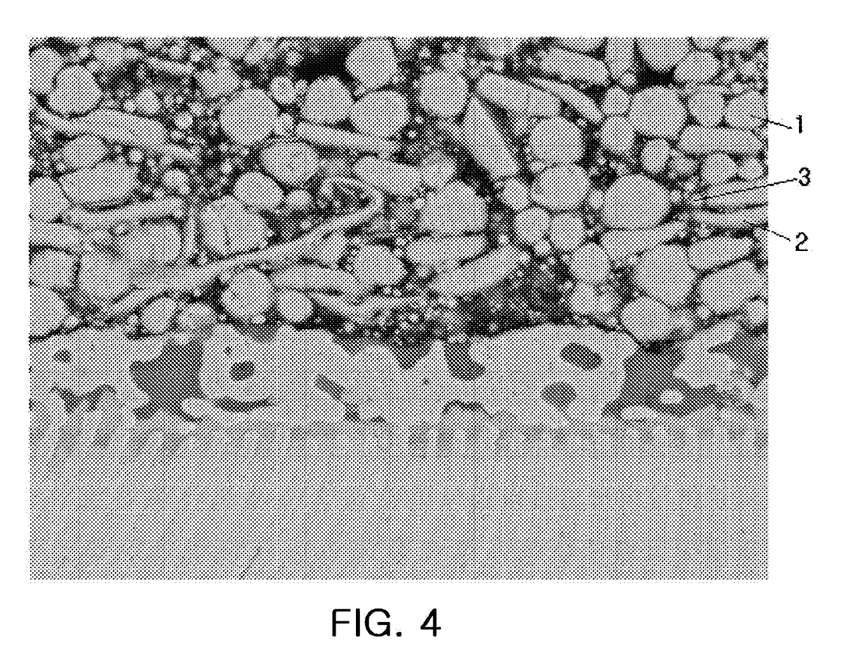
FIG. 4 is a scanning electron microscope (SEM) image showing a cross-section of an external electrode of the multilayer ceramic capacitor according to the embodiment of the present invention.

FIG. 4 is a scanning electron microscope (SEM) image showing a cross-section of an external electrode of the multilayer ceramic capacitor according to the embodiment of the present invention.

Referring to FIGS. 1 to 4, a multilayer ceramic electronic component according to an embodiment of the present invention may include: a ceramic body 10 including dielectric layers 11; a plurality of internal electrodes 21 stacked within the ceramic body 10; and external electrodes 31 and 32 formed on external surfaces of the ceramic body 10 and electrically connected to the internal electrodes 21 and 22, wherein the external electrodes 31 and 32 may include metal layers 31a and 32a and conductive resin layers 31b and 32b formed on the metal layers 31a and 32a, the conducive resin layers 31b and 32b containing a copper powder and an epoxy resin, the copper powder including a first copper powder having a content of 10 wt % or more and a particle diameter of 2 μm or larger and a second copper powder having a content of 5 wt % or more and a particle diameter of 0.7 μm or smaller, the first copper powder being a mixture of spherical powder particles and flake type powder particles.

Hereinafter, a multilayer ceramic electronic component according to an embodiment of the present invention, particularly, a multilayer ceramic capacitor, will be described, but the present invention is not limited thereto.

The ceramic body 10 may have, but is not limited to, for example, a hexahedral shape.

Meanwhile, with respect to the multilayer ceramic capacitor according to the embodiment, a 'length direction', a 'width direction', and a 'thickness direction' are designated as an 'L' direction, a 'W' direction, and a 'T' direction in FIG. 1, respectively. Here, the 'thickness direction' may be used to have the same concept as a direction in which dielectric layers are laminated, that is, a 'lamination direction'.

According to an embodiment of the present invention, a raw material for forming the ceramic body 10 is not particularly limited as long as sufficient capacitance can be obtained therewith. For example, the raw material may be a barium titanate ($BaTiO_3$) powder.

As a material for forming the ceramic body 10, various ceramic additives, organic solvents, plasticizers, binders, dispersants, or the like may be added to powder such as barium titanate ($BaTiO_3$) powder, depending on the intended purpose of the present invention.

A material for forming the plurality of internal electrodes 21 and 22 is not particularly limited. The internal electrodes 21 and 22 may be formed of, for example, a conductive paste including at least one of silver (Ag), lead (Pd), platinum (Pt), nickel (Ni), and copper (Cu).

The multilayer ceramic capacitor according to the embodiment of the present invention may include the external electrodes 31 and 32 electrically connected to the plurality of internal electrodes 21 and 22.

The external electrodes 31 and 32 may be electrically connected to the internal electrodes 21 and 22 for forming capacitance.

According to the embodiment of the present invention, the external electrodes 31 and 32 may include metal layers 31a and 32a and conductive resin layers 31b and 32b formed on the metal layers 31a and 32a.

The metal layers 31a and 32a may contain, but are not limited to, for example, a conductive metal of 60 wt % or less based on the total weight thereof.

The conductive metal used for the metal layers 31a and 32a is not particularly limited as long as it can be electrically connected to the internal electrodes to form capacitance. For example, the conductive metal may be at least one selected from the group consisting of copper (Cu), nickel (Ni), silver (Ag), and silver-palladium (Ag—Pd).

The conductive resin layers 31b and 32b are formed on the metal layers 31a and 32a, and may be formed such that the metal layers 31a and 32a are completely covered, but are not limited thereto.

According to an embodiment of the present invention, the conductive resin layers 31b and 32b may contain a copper powder and an epoxy resin.

In a general multilayer ceramic capacitor, cracks may occur due to external impacts. This occurrence of cracks may result from the fact that the external electrodes may not sufficiently absorb stress or stress may occur in a plating layer.

In order to solve the defects, a resin composition containing a conductive material is coated between the metal layer of the external electrode and a plating layer, so that external impacts may be absorbed and thus reliability may be improved.

However, in the case of coating the resin composition, an increase in equivalent series resistance (ESR) may be caused as compared to the case of a general copper (Cu) sintered external electrode.

According to an embodiment of the present invention, the conductive resin layers 31b and 32b may contain a copper powder and an epoxy resin, to absorb external impacts, thereby improving reliability.

The epoxy resin contained in the conductive resin layers 31b and 32b is not particularly limited, but may have, for example, a content of 5 to 30 parts by weight based on 100 parts by weight of the copper powder.

If the content of the epoxy resin is below 5 parts by weight, it may be difficult to prepare the paste due to a shortage of resin, phase separation may be caused, or viscosity may be changed with time due to deteriorations in phase stability. Further, in the case, copper dispersion may be degraded and thus a filling rate is decreased, causing decreases in compactness.

If the content of the epoxy resin is greater than 30 parts by weight, contact properties between metals are deteriorated, such that specific resistance is increased due to an excessive content of resin, and the area of resin on a surface portion is increased. Therefore, an unplated portion may be generated when the plating layer is formed after the conductive resin layer is formed.

Meanwhile, according to the embodiment of the present invention, the conducive resin layers 31b and 32b may contain a copper powder and an epoxy resin. The copper powder may include a first copper powder having a content of 10 wt % or more and a particle diameter (D1) of 2 μm or greater and a second copper powder 3 having a content of 5 wt % or more and a particle diameter (D2) of 0.7 μm or smaller. The first copper powder may be a mixture of spherical powder particles 1 and flake type powder particles 2.

Therefore, according to the embodiment of the present invention, a defect in which equivalent series resistance (ESR) increases may be solved by including predetermined contents of different kinds of copper powders having different average particle diameters as described above.

That is, unlike a general conductive resin layer, the copper powder includes the first copper powder having a content of 10 wt % or more and the particle diameter (D1) of 2 μm or greater and the second copper powder 3 having a content of 5 wt % or more and the particle diameter (D2) of 0.7 μm or smaller, such that a multilayer ceramic capacitor having improved equivalent series resistance (ESR) characteristics and high reliability can be realized.

As described above, the particle diameter (D1) of the first copper powder is controlled to be 2 μM or greater, so that delamination between the layers of the external electrodes 31 and 32 may be prevented in the multilayer ceramic capacitor.

In addition, the particle diameter (D2) of the second copper powder 3 is controlled to be 0.7 μm or smaller, to allow second copper powder particles to be distributed between the powder particles the first copper powder, so that the area of metal on the conductive resin layers 31b and 32b can be increased to improve plating properties in the multilayer ceramic capacitor.

If the particle diameter (D1) of the first copper powder is below 2 μm or the particle diameter (D2) of the second copper powder 3 is above 0.7 μm, plating defects may occur or delamination between the layers of the external electrodes 31 and 32 may occur.

In addition, the first copper powder having a content of 10 wt % or more and the second copper powder 3 having a content of 5 wt % or more are provided, a multilayer ceramic capacitor having improved equivalent series resistance (ESR) characteristics and a high degree of reliability may be realized.

Figure 3:
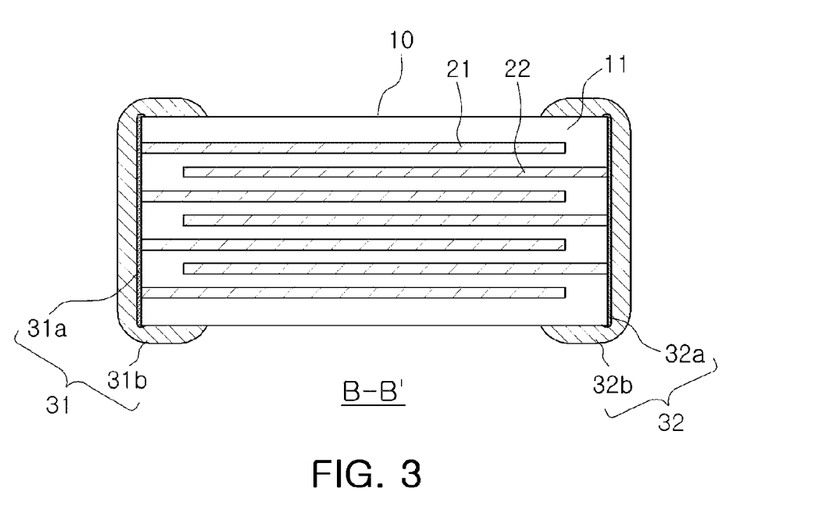
FIG. 3 is a cross-sectional view taken along line B-B' of FIG. 2.

The contents of the first copper powder and the second copper powder may be measured by image-scanning a cross-section of the multilayer ceramic capacitor taken in a length direction, using a scanning electron microscope (SEM), as shown in FIG. 3.

Specifically, as shown in FIG. 3, the contents of the first copper powder and the second copper powder may be measured by observing a region of 10 μm×10 μm in length and thickness directions in a conductive resin layer region, extracted from an image obtained by scanning a cross-section in length and thickness (L-T) directions, cut in a central portion of the multilayer ceramic capacitor in the width (W) direction thereof, using a scanning electron microscope (SEM).

The contents of the first copper powder and the second copper powder may be calculated from the areas occupied by the first copper powder and the second copper powder that are measured.

That is, in the identical copper powder, the copper powder particles may be considered to have identical specific gravities, and the contents of respective powders contained in the conductive resin layer may be calculated by converting the measured areas occupied by the respective powder particles thereof, based on their identical specific gravities.

The content of the first copper powder may be calculated as the sum of contents of spherical powder particles and flake type powder particles, and may be obtained by calculating copper powder particles having a particle diameter of 2 μm or greater.

In addition, the content of the second copper powder may be obtained by calculating copper powder particles having a particle diameter of 0.7 μm or smaller.

The contents of the first copper powder and the second copper powder may refer to weight percentages of the respective powders as compared to the entire region of the conductive resin layers from which the first copper powder and the second copper powder are extracted.

When the first copper powder included in the copper powder has a content of below 10 wt % or the second copper powder included in the copper powder has a content of below 5 wt %, plating defects may occur or delamination between the layers of the external electrodes may occur.

The first copper powder may be, but is not limited to, for example, a mixture of the spherical powder particles 1 and the flake type powder particles 2.

In the first copper powder, the content of the spherical powder particles 1 in the external electrodes may be equal to or greater than the content of the flake type powder particles 2 in the external electrodes, but is not limited thereto.

The spherical powder particles 1 may be defined as having a major axis to minor axis length ratio (major axis/minor axis) of 1.45 or smaller, for example.

Meanwhile, the flake type powder particles 2 may be defined as having a major axis to minor axis length ratio (major axis/minor axis) of 1.95 or greater, but is not limited thereto.

The lengths of major axis and minor axis of the spherical powder particles 1 and the flake type powder particles 2 may be measured by image-scanning a cross-section of the multilayer ceramic capacitor in the length direction, using a scanning electron microscope (SEM), as shown in FIG. 3.

Specifically, as shown in FIG. 3, the lengths of major and minor axes of the spherical powder particles 1 and the flake type powder particles 2 may be measured by observing a region of 10 μm×10 μm in length and thickness directions in a conductive resin layer region, extracted from an image obtained by scanning a cross-section in length and thickness (L-T) directions, cut in a central portion of the multilayer ceramic capacitor in the width (W) direction thereof, using a scanning electron microscope (SEM).

Referring to FIG. 4, it may be seen that the conductive resin layer region of the external electrodes include the spherical and flake type powder particles 1 and 2 of the first copper powder and the second copper powder 3 having a smaller particle diameter than that of the first copper powder.

In the multilayer ceramic capacitor according to an embodiment of the present invention, the equivalent series resistance (ESR) of the multilayer ceramic capacitor may satisfy, for example, 0.1 mΩ≤ESR≤30 mΩ, but the present invention is not particularly limited.

A multilayer ceramic electronic component according to another embodiment of the present invention may include: the ceramic body 10 including the dielectric layers 11; the plurality of internal electrodes 21 stacked within the ceramic body 10; and the external electrodes 31 and 32 formed on the external surfaces of the ceramic body 10 and electrically connected to the internal electrodes 21 and 22, wherein the external electrodes 31 and 32 may include the metal layers 31a and 32a and the conductive resin layers 31b and 32b formed on the metal layers 31a and 32a, the conducive resin layers 31b and 32b containing a copper powder and an epoxy resin, the copper powder including a first copper powder having a particle diameter of 2 μm or greater and a second copper powder having a particle diameter of 0.7 μm or smaller, the first copper powder being a mixture of spherical powder particles and flake type powder particles, an area occupied by the first copper powder in the conductive resin layers being 10% or more and an area occupied by the second copper powder in the conductive resin layers being 5% or more.

In the first copper powder, the area occupied by the spherical powder particles in the external electrodes may be equal to or greater than the area occupied by the flake type powder particles in the external electrodes.

The spherical powder particles may have a major axis to minor axis length ratio (major axis/minor axis) of 1.45 or smaller.

The flake type powder particles may have a major axis to minor axis length ratio (major axis/minor axis) of 1.95 or greater.

The equivalent series resistance (ESR) of the multilayer ceramic electronic component may satisfy 0.1 mΩ≤ESR≤30 mΩ.

Hereinafter, a multilayer ceramic electronic component according to another embodiment of the present invention, particularly, a multilayer ceramic capacitor, will be described, but the present invention is not limited thereto.

In addition, in characteristics of the multilayer ceramic capacitor according to another embodiment of the present invention, descriptions of the same characteristics as the multilayer ceramic electronic component according to the above-described embodiment of the present invention will be omitted in order to avoid repeated explanations.

According to another embodiment of the present invention, the area occupied by the first copper powder in the conductive resin layers 31b and 32b may be 10% or more, and the area occupied by the second copper powder in the conductive resin layers 31b and 32b may be 5% or more.

The areas occupied by the first copper powder and the second copper powder may be measured by image-scanning a cross-section of the multilayer ceramic capacitor in the length direction, using a scanning electron microscope (SEM), as shown in FIG. 3.

Specifically, as shown in FIG. 3, the areas of the first copper powder and the second copper powder may be measured by observing a region of 10 μm×10 μm in length and thickness directions in a conductive resin layer region, extracted from an image obtained by scanning a cross-section in length and thickness (L-T) directions, cut in a central portion of the multilayer ceramic capacitor in the width (W) direction thereof, using a scanning electron microscope (SEM).

The area of the first copper powder may be measured as the sum of areas of the spherical powder particles and the flake type powder particles, as described above, and may be obtained by measuring powder particles having a particle diameter of 2 μm or greater.

In addition, the area of the second copper powder may be obtained by measuring powder particles having a particle diameter of 0.7 μm or smaller.

The area occupied by the first copper powder and the area occupied by the second copper powder may refer to percentages of areas occupied by the respective powders as compared to the entire region of the conductive resin layers from which the first copper powder and the second copper powder are extracted.

According to another embodiment of the present invention, the area occupied by the first copper powder is controlled to be 10% or more and the area occupied by the second copper powder is controlled to be 5% or more in the conductive resin layers 31b and 32b, such that a multilayer ceramic capacitor having improved equivalent series resistance (ESR) characteristics and a high degree of reliability can be realized.

When the area of the first copper powder is below 10% or the area of the second copper powder is below 5 wt %, plating defects may occur or delamination between the layers of the external electrodes may occur in the multilayer ceramic capacitor.

Meanwhile, in the first copper powder, the area occupied by the spherical powder particles 1 in the external electrodes may be equal to or greater than the area occupied by the flake type powder particles 2 in the external electrodes, but is not limited thereto.

Therefore, according to another embodiment of the present invention, the defect in which equivalent series resistance (ESR) increases may be solved by including predetermined contents of different kinds of copper powders having different average particle diameters as described above.

That is, unlike a general conductive paste for an external electrode, the copper powder includes the first copper powder having an area of 10 wt % or more and the particle diameter (D1) of 2 μm or greater and the second copper powder 3 having an area of 5 wt % or more and the particle diameter (D2) of 0.7 μm or smaller, such that a multilayer ceramic capacitor having improved equivalent series resistance (ESR) characteristics and high degrees of reliability can be realized.

Hereafter, the present invention will be described in detail with reference to inventive examples, but is not limited thereto.

The present embodiment was performed on the multilayer ceramic capacitor in order to check soldering test results and delamination test results depending on the contents and particle diameters of the first copper powder and the second copper powder included in the conductive resin layers of the external electrodes.

Each multilayer ceramic capacitor according to the present inventive examples was manufactured as follows.

First, a slurry containing a powder such as barium titanate ($BaTiO_3$) or the like was applied to respective carrier films and dried thereon, to thereby prepare a plurality of ceramic green sheets, whereby dielectric layers were formed.

Then, a conductive paste for an internal electrode having an average nickel particle diameter of 0.05 to 0.2 μm was prepared.

The conductive paste for an internal electrode was coated on the ceramic green sheets by a screen printing method, to thereby form internal electrodes, and then the resultant ceramic green sheets were laminated in an amount of 50 layers to thereby prepare a laminate.

After that, compressing and cutting were performed to produce chips of 0603 standard size, and each of the chips was sintered at a temperature of 1050 to 1200° C. under a reducing atmosphere of $H_2$ of 0.1% or less.

Then, external electrodes were prepared by forming metal layers using a conductive paste containing a conductive metal and a glass frit and forming conductive resin layers on the metal layers, respectively. Here, the conductive resin layers are formed while the contents of the first and second copper powders having different particle diameters were varied but and the numerical ranges of the present invention were satisfied.

Then, a plating process and the like were performed on the external electrodes, to thereby form multilayer ceramic capacitors.

On the other hand, the manufacturing method for comparative examples was the same except that the contents and particle diameters of the first and second powders deviated from the numerical ranges of the present invention.

Table 1 below compares soldering test results and delamination test results depending on the contents and particle diameters of the first copper powder and the second copper powder contained in the conductive resin layers of the external electrodes in the multilayer ceramic capacitor.

The soldering test was conducted by vertically dipping the multilayer ceramic capacitor into a solder bath filled with solder and lead (Pb) and then inspecting whether or not a surface was covered with the lead. It was determined to be good (○) when plating was well done, without disconnections, and bad (X) otherwise.

Next, the delamination test was conducted by dipping the multilayer ceramic capacitor in a lead bath at 300° C. for 10 seconds and then carrying out internal analysis to thereby inspect whether or not delamination between layers occurred in the external electrodes.

It was determined to be good (○) when there was no delamination and bad (X) otherwise

TABLE 1

|  | Content of First Powder | Content of Second Powder | Average Particle Diameter of D1 (μm) | Average Particle Diameter of D2 (μm) | Soldering Test | Delamination Test |
|---|---|---|---|---|---|---|
| *1 | Below 10 wt % | Below 5 wt % | 1.5 | 1.0 | X | X |
| *2 | | | | 0.7 | X | X |
| *3 | | | | 0.3 | X | X |
| *4 | | | 2.0 | 1.0 | | ○ |
| *5 | | | | 0.7 | X | ○ |
| *6 | | | | 0.3 | X | ○ |
| *7 | | | 2.5 | 1.0 | X | ○ |
| *8 | | | | 0.7 | X | ○ |
| *9 | | | | 0.3 | X | ○ |
| *10 | | | 3.0 | 1.0 | X | ○ |
| *11 | | | | 0.7 | X | ○ |
| *12 | | | | 0.3 | X | ○ |
| *13 | | 5 wt % or More | 1.5 | 1.0 | X | X |
| *14 | | | | 0.7 | X | X |
| *15 | | | | 0.3 | X | X |
| *16 | | | 2.0 | 1.0 | X | ○ |
| *17 | | | | 0.7 | X | ○ |
| *18 | | | | 0.3 | X | ○ |
| *19 | | | 2.5 | 1.0 | X | ○ |
| *20 | | | | 0.7 | X | ○ |
| *21 | | | | 0.3 | X | ○ |
| *22 | | | 3.0 | 1.0 | X | ○ |
| *23 | | | | 0.7 | X | ○ |
| *24 | | | | 0.3 | X | ○ |
| *25 | 10 wt % or More | Below 5 wt % | 1.5 | 1.0 | X | X |
| *26 | | | | 0.7 | ○ | X |
| *27 | | | | 0.3 | ○ | X |
| *28 | | | 2.0 | 1.0 | X | ○ |
| *29 | | | | 0.7 | X | ○ |
| *30 | | | | 0.3 | X | ○ |
| *31 | | | 2.5 | 1.0 | X | ○ |
| *32 | | | | 0.7 | X | ○ |
| *33 | | | | 0.3 | X | ○ |
| *34 | | | 3.0 | 1.0 | X | ○ |
| *35 | | | | 0.7 | X | ○ |
| *36 | | | | 0.3 | X | ○ |
| *37 | | 5 wt % or More | 1.5 | 1.0 | ○ | X |
| *38 | | | | 0.7 | ○ | X |
| *39 | | | | 0.3 | ○ | X |
| *40 | | | 2.0 | 1.0 | X | ○ |
| 41 | | | | 0.7 | ○ | ○ |
| 42 | | | | 0.3 | ○ | ○ |
| *43 | | | 2.5 | 1.0 | X | ○ |
| 44 | | | | 0.7 | ○ | ○ |
| 45 | | | | 0.3 | ○ | ○ |
| *46 | | | 3.0 | 1.0 | X | ○ |
| 47 | | | | 0.7 | ○ | ○ |
| 48 | | | | 0.3 | ○ | ○ |

*Comparative Example

As can be seen from Table 1 above, in Samples 1 to 40, 43, and 46, as comparative examples, deviating from the numerical ranges of the present invention, the plating problem or delamination between layers of the external electrodes occurred.

Whereas, in Samples 41, 42, 44, 45, 47, and 48, as inventive examples of the present invention, satisfying the numerical ranges of the present invention, plating defects or delamination between layers of the external electrodes did not occur.

Table 2 below compares soldering test results and delamination test results depending on the area percentages occupied by the first copper powder and the second copper powder and the particle diameters of the first copper powder and the second copper powder, which are included in the conductive resin layers of the external electrodes in the multilayer ceramic capacitor.

The soldering test was conducted by vertically dipping the multilayer ceramic capacitor in a solder bath filled with solder and lead (Pb) and then checking whether or not a surface was covered with the lead. It was determined to be good (○) when plating was well done without disconnections and bad (X) otherwise.

Next, the delamination test was conducted by dipping the multilayer ceramic capacitor in a lead bath at 300° C. for 10 seconds and then carrying out internal analysis to thereby inspect whether or not delamination between layers occur in the external electrodes.

It was determined to be good (○) when there was no delamination and bad (X) otherwise

TABLE 2

|  | Area Occupied by First Powder | Area Occupied by First Powder | Average Particle diameter of D1 (μm) | Average Particle diameter of D2 (μm) | Soldering Test | Delamination Test |
|---|---|---|---|---|---|---|
| *1 | Below 10 wt % | Below 5% | 1.5 | 1.0 | X | X |
| *2 |  |  |  | 0.7 | X | X |
| *3 |  |  |  | 0.3 | X | X |
| *4 |  |  | 2.0 | 1.0 | X | ○ |
| *5 |  |  |  | 0.7 | X | ○ |
| *6 |  |  |  | 0.3 | X | ○ |
| *7 |  |  | 2.5 | 1.0 | X | ○ |
| *8 |  |  |  | 0.7 | X | ○ |
| *9 |  |  |  | 0.3 | X | ○ |
| *10 |  |  | 3.0 | 1.0 | X | ○ |
| *11 |  |  |  | 0.7 | X | ○ |
| *12 |  |  |  | 0.3 | X | ○ |
| *13 |  | 5% or More | 1.5 | 1.0 | X | X |
| *14 |  |  |  | 0.7 | X | X |
| *15 |  |  |  | 0.3 | X | X |
| *16 |  |  | 2.0 | 1.0 | X | ○ |
| *17 |  |  |  | 0.7 | X | ○ |
| *18 |  |  |  | 0.3 | X | ○ |
| *19 |  |  | 2.5 | 1.0 | X | ○ |
| *20 |  |  |  | 0.7 | X | ○ |
| *21 |  |  |  | 0.3 | X | ○ |
| *22 |  |  | 3.0 | 1.0 | X | ○ |
| *23 |  |  |  | 0.7 | X | ○ |
| *24 |  |  |  | 0.3 | X | ○ |
| *25 | 10% or More | Below 5% | 1.5 | 1.0 | X | X |
| *26 |  |  |  | 0.7 | ○ | X |
| *27 |  |  |  | 0.3 | ○ | X |
| *28 |  |  | 2.0 | 1.0 | X | ○ |
| *29 |  |  |  | 0.7 | X | ○ |
| *30 |  |  |  | 0.3 | X | ○ |
| *31 |  |  | 2.5 | 1.0 | X | ○ |
| *32 |  |  |  | 0.7 | X | ○ |
| *33 |  |  |  | 0.3 | X | ○ |
| *34 |  |  | 3.0 | 1.0 | X | ○ |
| *35 |  |  |  | 0.7 | X | ○ |
| *36 |  |  |  | 0.3 | X | ○ |
| *37 |  | 5% or More | 1.5 | 1.0 | ○ | X |
| *38 |  |  |  | 0.7 | ○ | X |
| *39 |  |  |  | 0.3 | ○ | X |
| *40 |  |  | 2.0 | 1.0 | X | ○ |
| 41 |  |  |  | 0.7 | ○ | ○ |
| 42 |  |  |  | 0.3 | ○ | ○ |
| *43 |  |  | 2.5 | 1.0 | X | ○ |
| 44 |  |  |  | 0.7 | ○ | ○ |
| 45 |  |  |  | 0.3 | ○ | ○ |
| *46 |  |  | 3.0 | 1.0 | X | ○ |
| 47 |  |  |  | 0.7 | ○ | ○ |
| 48 |  |  |  | 0.3 | ○ | ○ |

*Comparative Example

As can be seen from Table 2 above, in Samples 1 to 40, 43, and 46, as comparative examples, deviating from the numerical ranges of the present invention, plating defects or delamination between layers occurred.

Whereas, in Samples 41, 42, 44, 45, 47, and 48, as inventive examples of the present invention, satisfying the numerical ranges of the present invention, plating defects or delamination between layers of the external electrode did not occur.

Figure 5:
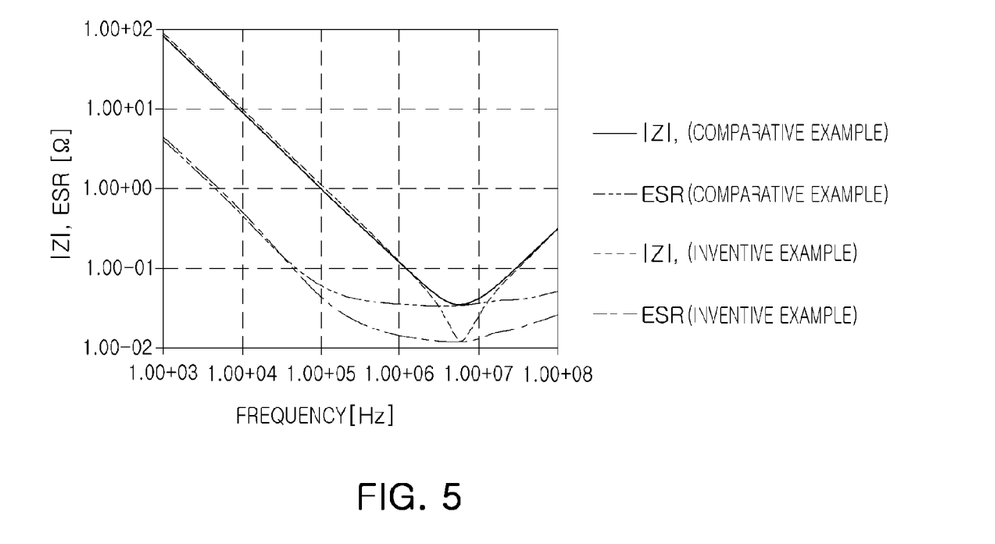
FIG. 5 is a graph comparing impedance (Z) and ESR according to Inventive Examples and Comparative Examples of the present invention.

FIG. 5 is a graph comparing impedance (Z) and ESR according to Inventive Examples and Comparative Examples of the present invention.

Referring to FIG. 5, impedance (Z) and ESR measurement results of inventive examples and comparative examples of the present invention were shown. It may be seen that the inventive examples of the present invention had smaller impedance (Z) and ESR values than those of the comparative examples.

That is, according to the embodiment of the present invention, a multilayer ceramic electronic component having excellent equivalent series resistance (ESR) characteristics and high degrees of reliability can be realized by using a conductive paste for an external electrode, containing a first powder in which spherical powder particles and flake type powder particles are mixed and a second powder having a smaller average particle diameter than that of the first powder.

As set forth above, according to the present invention, a multilayer ceramic electronic component having excellent equivalent series resistance (ESR) characteristics and high degrees of reliability can be realized by using a conductive paste for an external electrode, containing a first copper powder in which spherical powder particles and flake type powder particles are mixed and a second copper powder having a smaller average particle diameter than that of the first copper powder.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic body including dielectric layers;
    a plurality of internal electrodes stacked within the ceramic body; and
    external electrodes formed on external surfaces of the ceramic body and electrically connected to the internal electrodes,
    wherein the external electrodes include a metal layer directly connected to the internal electrodes and a conductive resin layer formed on the metal layer and connected to the internal electrodes via the metal layer,
    the metal layer including glass materials, and
    the conductive resin layer containing a copper powder and an epoxy resin, the copper powder including a first copper powder having a content of 10 wt % or more in the conductive resin layer and a particle diameter of 2 μm or greater and a second copper powder having a content of 5 wt % or more in the conductive resin layer and a particle diameter of 0.7 μm or smaller, the first copper powder being a mixture of spherical powder particles and flake type powder particles.

2. The multilayer ceramic electronic component of claim 1, wherein in the first copper powder, a content of the spherical powder particles is equal to or greater than a content of the flake type powder particles.

3. The multilayer ceramic electronic component of claim 1, wherein the spherical powder particles have a major axis to minor axis length ratio (major axis/minor axis) of 1.45 or smaller.

4. The multilayer ceramic electronic component of claim 1, wherein the flake type powder particles have a major axis to minor axis length ratio (major axis/minor axis) of 1.95 or greater.

5. The multilayer ceramic electronic component of claim 1, wherein an equivalent series resistance (ESR) of the multilayer ceramic electronic component satisfies 0.1 mΩ≤ESR≤30 mΩ.

6. A multilayer ceramic electronic component, comprising:
    a ceramic body including dielectric layers;
    a plurality of internal electrodes stacked within the ceramic body; and
    external electrodes formed on external surfaces of the ceramic body and electrically connected to the internal electrodes,
    wherein the external electrodes include a metal layer directly connected to the internal electrodes and a conductive resin layer formed on the metal layer and connected to the internal electrodes via the metal layer,
    the metal layer including glass materials, and
    the conductive resin layer containing a copper powder and an epoxy resin, the copper powder including a first copper powder having a particle diameter of 2 μm or greater and a second copper powder having a particle diameter of 0.7 μm or smaller, the first copper powder being a mixture of spherical powder particles and flake type powder particles, an area occupied by the first copper powder in the conductive resin layer being 10% or more, and an area occupied by the second copper powder in the conductive resin layer being 5% or more.

7. The multilayer ceramic electronic component of claim 6, wherein in the first copper powder, an area occupied by the spherical powder particles in the external electrodes is equal to or greater than an area occupied by the flake type powder particles in the external electrodes.

8. The multilayer ceramic electronic component of claim 6, wherein the spherical powder particles have a major axis to minor axis length ratio (major axis/minor axis) of 1.45 or smaller.

9. The multilayer ceramic electronic component of claim 6, wherein the flake type powder particles have a major axis to minor axis length ratio (major axis/minor axis) of 1.95 or greater.

10. The multilayer ceramic electronic component of claim 6, wherein an equivalent series resistance (ESR) of the multilayer ceramic electronic component satisfies 0.1 mΩ≤ESR≤30 mΩ.

* * * * *